(12) United States Patent
Huisinga et al.

(10) Patent No.: US 8,069,819 B2
(45) Date of Patent: Dec. 6, 2011

(54) EGG INCUBATION TRANSPORT SYSTEM AND METHODS REGARDING SAME

(75) Inventors: Richard D. Huisinga, Willmar, MN (US); Paul R. Wreede, Litchfield, MN (US)

(73) Assignee: Life-Science Innovations, LLC, Willmar, MN (US)

( * ) Notice: Subject to any disclaimer, the term of this patent is extended or adjusted under 35 U.S.C. 154(b) by 0 days.

(21) Appl. No.: 12/981,229

(22) Filed: Dec. 29, 2010

(65) Prior Publication Data

US 2011/0094452 A1   Apr. 28, 2011

Related U.S. Application Data

(62) Division of application No. 11/784,616, filed on Apr. 9, 2007, now Pat. No. 7,861,673.

(60) Provisional application No. 60/791,093, filed on Apr. 11, 2006.

(51) Int. Cl.
*A01K 41/00* (2006.01)
(52) U.S. Cl. ......................... 119/300; 119/311
(58) Field of Classification Search .................. 119/300, 119/311, 302, 322
See application file for complete search history.

(56) References Cited

U.S. PATENT DOCUMENTS

| | | |
|---|---|---|
| 3,147,737 A | 9/1964 | Theilig |
| 3,817,215 A | 6/1974 | Levin |
| 3,958,711 A | 5/1976 | Morris et al. |
| 4,004,552 A | 1/1977 | Levin |
| 4,141,320 A | 2/1979 | Hatfield |
| 4,378,758 A | 4/1983 | Coleman |
| 4,398,499 A | 8/1983 | Blakely |
| 4,411,221 A | 10/1983 | Pearce |
| 4,558,661 A | 12/1985 | Theilig et al. |
| 5,025,619 A | 6/1991 | Cannon |
| 5,046,454 A | 9/1991 | Jensen |
| 5,146,871 A | 9/1992 | Havran |
| 5,179,913 A | 1/1993 | Cannon |
| 5,226,385 A | 7/1993 | Cannon |
| D346,324 S | 4/1994 | Warren |
| 5,508,165 A | 4/1996 | Halverson et al. ............... 435/6 |
| 5,648,468 A | 7/1997 | Spaulding ................... 530/359 |
| 5,816,406 A | 10/1998 | Jupille et al. |
| 6,029,080 A | 2/2000 | Reynnells et al. |
| 6,129,505 A | 10/2000 | Jupille et al. |
| 6,196,160 B1 | 3/2001 | Pas |
| 6,506,570 B1 | 1/2003 | Phelps ........................ 435/7.21 |

(Continued)

FOREIGN PATENT DOCUMENTS

EP    0 375 030 A1    6/1990

(Continued)

OTHER PUBLICATIONS

"Advantages" datasheet [online]. HatchTech, Veenendaal, The Netherlands [retrieved on Feb. 13, 2007]. Retrieved from the Internet:<URL:http://www.hatchtech.nl/html/advantages_uk.htm>; 3 pgs.

(Continued)

*Primary Examiner* — Yvonne R. Abbott
(74) *Attorney, Agent, or Firm* — Mueting, Raasch & Gebhardt, P.A.

(57) ABSTRACT

Methods and systems provide for incubating a plurality of eggs at least partially at a primary incubation location and then incubating the plurality of eggs (e.g., a plurality of single sex eggs sorted from the plurality of eggs) at least partially during transport to a secondary location.

21 Claims, 10 Drawing Sheets

U.S. PATENT DOCUMENTS

| | | |
|---|---|---|
| 6,708,755 B1 | 3/2004 | Meter |
| 6,805,244 B1 | 10/2004 | Toelken |
| 7,021,552 B2 | 4/2006 | Meter |
| 2003/0096319 A1 | 5/2003 | Phelps .......................... 435/7.2 |
| 2003/0172392 A1 | 9/2003 | Mendu et al. .................. 800/19 |
| 2004/0034879 A1 | 2/2004 | Rothstein et al. ................ 800/8 |

FOREIGN PATENT DOCUMENTS

| | | |
|---|---|---|
| EP | 0 375 030 B1 | 10/1993 |
| EP | 0 504 157 B1 | 1/1996 |
| EP | 0 930 235 A1 | 7/1999 |
| GB | 1 394 902 | 5/1975 |
| GB | 1 444 398 | 7/1976 |
| GB | 1 492 854 | 11/1977 |
| GB | 1 588 589 | 4/1981 |
| GB | 2 093 328 A | 9/1982 |
| WO | WO 2005/046322 A1 | 5/2005 |
| WO | WO 2005/070198 A1 | 8/2005 |

OTHER PUBLICATIONS

"Concept" datasheet [online]. HatchTech, Veenendaal, The Netherlands [retrieved on Feb. 13, 2007]. Retrieved from the Internet:<URL:http://www.hatchtech.nl/html/concept_uk.htm>; 2 pgs.

"Innovations" datasheet [online]. HatchTech, Veenendaal, The Netherlands [retrieved on Feb. 13, 2007]. Retrieved from the Internet:<URL:http://www.hatchtech.nl/html/innovations_uk.htm>; 3 pgs.

"Products" datasheet [online]. HatchTech, Veenendaal, The Netherlands [retrieved on Feb. 22, 2007]. Retrieved from the Internet:<URL:http://www.hatchtech.nl/html/frames/products.html>; 4 pgs.

"Products" datasheet [online]. Available on website Apr. 5, 2004. HatchTech, Veenendaal, The Netherlands [retrieved on Oct. 18, 2007]. Retrieved from the Internet: <URL:http://web.archive.org/web/20040405100710/http://www.hatchtech.nl/>; 4 pgs.

Fig. 8

| | Temperature (°F) | Tolerance | RH (%) | Tolerance | $CO_2$ | Air cycling 14Kcfm @ 2" static |
|---|---|---|---|---|---|---|
| Incubator | 100.4 - 98.7 | +/- .5 | 60 - 50 | 5% | 1K - 5K ppm control range | 100% - 50% |
| Hatcher | 98.0 - 97.7 | +/- .5 | 85 - 63 | 5% | 1K - 5K ppm control range | 100% - 85% |
| Poult Transport | 90.0 - 80.0 | +/- 5 | 80 - 50 | 5% | 1K - 5K ppm control range | 100% | ant
EGG INCUBATION TRANSPORT SYSTEM AND METHODS REGARDING SAME

CROSS-REFERENCE TO RELATED APPLICATIONS

This application is a division of U.S. patent application Ser. No. 11/784,616, filed 9 Apr. 2007, which claims the benefit of U.S. Provisional Application Ser. No. 60/791,093, filed 11 Apr. 2006, entitled "Egg Incubation Transport System and Methods Regarding Same," which are all incorporated herein by reference.

TECHNICAL FIELD OF THE INVENTION

The present invention relates generally to the incubation of eggs. More particularly, the present invention relates to methods and systems for incubation of eggs (e.g., methods and systems that include incubation of eggs during transport from one location to another).

BACKGROUND OF THE INVENTION

Generally, controlled climate chambers are used for the incubation of eggs. For example, the eggs are placed in the controlled climate chamber and climatic conditions are matched as well as possible to the optimum growth conditions for the embryos in the eggs. For example, the eggs may be subjected to a temperature progression. Such a temperature progression may start at a particular temperature (e.g., 100° Fahrenheit), which is then lowered because the eggs themselves start to produce heat. Such incubation of the eggs through hatch is generally performed according to an incubation profile that takes into consideration necessary temperature changes, as well as other climatic conditions (e.g., carbon dioxide ($CO_2$) content, humidity, etc.). The incubation process is typically carried out in a particular controlled climate chamber at a single hatchery facility (e.g., the incubation process is tied to a single facility).

As indicated above, generally, in the hatchery, eggs are hatched in a climate controlled chamber. The environment in this chamber is controlled to optimize the hatching process. In this context, temperature, $CO_2$ content, and humidity are some of the control variables controlled during the incubation process. The climate controlled chambers generally include large egg holding structures in which various trays holding eggs are placed. Such eggs during the incubation process may be held in a fixed position (e.g., using pallets of egg trays) or, eggs may be, for example, rotated during a part of the incubation process (e.g., incubator racks configured to hold the eggs such that the eggs can be moved to present the eggs in different positions relative to an air stream provided in the incubator). For example, in an exemplary and conventional incubation process for turkeys or ducks, incubation is completed in incubator racks and pallets for the first 25 days or so of an approximate 28 day incubation cycle. Thereafter, the eggs are transferred to hatch baskets for hatching. The eggs generally hatch approximately around the same time. For about the first day or so following hatch, the newly hatched poults can remain in a hatching chamber, living off the yolk, with little or no additional nutrients being introduced into the climate controlled chamber.

After the poults are hatched in a hatchery, they are generally transported as quickly as possible to a subsequent farm (e.g., for fattening, rearing, breeding, etc.). Such poults may be transported, for example, in an apparatus such as described in International Publication No. WO2005/070198 A1 entitled "Method for holding poikilothermic poultry, and device for holding poikilothermic poultry," assigned to HatchTech Group B.V., published 4 Aug. 2005, which describes a transportable climate controlled container (e.g., in which the temperature controlled).

In other words, a generally standard or conventional production cycle for poultry is for the poults to be hatched at a hatchery and then transported from the hatchery to a further farm, such as a fattening farm, where the poultry grows and is fattened. Farms of this type are generally many different fauns located at a distance from one another. For example, in many cases, such farms may be located a great distance from each other and/or from the hatchery.

Sex separate rearing is also an important component in the raising of poultry (e.g., turkey production). In other words, poults of a single sex are reared separate from those of the other sex. Typically, depending on production, processing/marketing requirements, and cost relationships, separate sex rearing can be of great economic benefit to poultry producers (e.g., one gender is raised much differently than another to optimize the production process). Yet further, in many circumstances, farms that raise one sex of poultry are generally located a substantial distance from farms that raise the other sex and/or may also be located a substantial distance from a hatchery.

SUMMARY OF THE INVENTION

According to the present invention, one or more apparatus, systems, transports, and/or methods provide one or more features associated with egg incubation. For example, at least in one or more embodiments, the present invention provides for a least a portion of an incubation process to occur while an egg (e.g., turkey, duck, chicken, pheasant, or any other type of egg) being incubated is being moved from one location (e.g., primary incubation location or hatchery) to another location (e.g., another hatchery, a grower, etc.), and/or an incubation process to occur at a particular location (e.g., a stationary incubator during a stop in transit, at a second hatchery, at grower, etc.) other than a primary incubation location (e.g., hatchery).

One method of incubation according to the present invention includes incubating a plurality of eggs at least partially at a primary incubation location and sorting the plurality of eggs according to sex (e.g., using magnetic resonance imaging or ultrasound imaging) resulting in at least a plurality of single sex eggs (e.g., sorting may occur at any time during such primary incubation and by one or more various methods). The method further includes incubating the plurality of single sex eggs at least partially during transport to a secondary location.

In one embodiment of the method, incubating the plurality of eggs at least partially at the primary incubation location includes controlling the incubation according to an incubation profile. Further, incubating the plurality of single sex eggs at least partially during transport to a secondary location may include controlling incubation during transport based on the incubation profile used to control the incubation at the primary incubation location (e.g., the incubation profile used to control incubation at the primary incubation location may be transferred to a controller operable to control the environment of a portable transport incubator used for incubation during transport of the single sex eggs).

Another method of incubation according to the present invention is also described. The method includes incubating a plurality of eggs at least partially at a primary incubation location (e.g., the incubation at the primary incubation location may be controlled according to an incubation profile).

The method further includes incubating a selected portion of the plurality of eggs (e.g., the selected portion being single sex eggs) at least partially during transport to a secondary location (e.g., the incubation during transport to the secondary location may be controlled based on the incubation profile used to control the incubation at the primary incubation location).

In one or more embodiments of the incubation methods (e.g., methods that may include egg sex sorting), a portable transport incubator is used to transport the plurality of eggs. The portable transport incubator is transportable by a vehicle (e.g., the vehicle may include at least one of an aircraft, a rail based vehicle, a water based vessel, a vehicle that transports cargo, and a wheeled vehicle, such as a semi-trailer truck).

Further, in one or more embodiments of the incubation methods (e.g., methods that may include egg sex sorting), the incubation profile may be based at least on one of genetics of the plurality of eggs, hold time of the plurality of eggs prior to transfer to an incubator, statistical performance of previous incubation processes, and one or more characteristics of an incubator used to perform the incubation of the plurality of eggs.

Still further, in one or more embodiments of the incubation methods (e.g., methods that may include egg sex sorting), a portable incubator used to transport the plurality of eggs may be a self-contained incubator capable by itself to incubate a plurality of eggs (e.g., the self-contained incubator may include a power source and controller configured to carry out such incubation, redundant components, etc.)

Yet further, in one or more embodiments of the incubation methods (e.g., methods that may include egg sex sorting), incubating the plurality of eggs at least partially during transport to the secondary location may include incubating the plurality of eggs in one or more pallet structures for holding the plurality of eggs in fixed position during transport to the secondary location (e.g., after the plurality of eggs have completed a portion of incubation that requires rotation of the plurality of eggs); may include rotating the plurality of eggs using one or more rack structures holding the plurality of eggs (e.g., moving the eggs as they are being incubated such as by movement of one or more portions of the rack structures, or the entire rack itself) as the plurality of eggs are incubated during transport to the secondary location; and/or may include incubating the plurality of eggs in one or more hatch structures (e.g., hatch baskets) configured to hold poultry hatched from the eggs as the plurality of eggs are incubated during transport to the secondary location.

In addition, in one or more embodiments of the incubation methods (e.g., methods that may include egg sex sorting), the methods further may include transferring the plurality of eggs to one or more hatch structures configured to hold poultry hatched from eggs after transport to the secondary location, and/or the methods may further include servicing poultry hatched from the plurality of eggs at the secondary location without performing a sexing operation.

In one or more additional embodiments of the incubation methods (e.g., methods that may include egg sex sorting), incubating the plurality of eggs at least partially during transport to a secondary location may include maintaining a controlled environment in a portable transport incubator based on an incubation profile used to control the incubation at the primary incubation location (e.g., adjusting at least one of humidity, carbon dioxide levels, and temperature in the portable transport incubator based on the incubation profile used to control the incubation at the primary incubation location). Incubating the plurality of eggs at least partially during transport to a secondary location may further include incubating the plurality of eggs at least partially during transport to a secondary location during a portion of the last 10 days of an incubation cycle (e.g., during the last 8 days, during the last 5 days).

Another method of incubation is also described. The method includes incubating a plurality of eggs at least partially at a primary incubation location (e.g., the incubation at the primary incubation location being controlled according to an incubation profile). The method further includes providing information associated with a secondary location where the plurality of eggs or poultry hatched from the plurality of eggs are to be transported and determining a time schedule for use in transferring at least a portion of the plurality of eggs to a portable transport incubator based on at least the incubation profile and the information associated with the secondary location (e.g., the portable transport incubator may be used to transport the at least a portion of the plurality of eggs to the secondary location).

In one embodiment of the method, the time schedule may further be for use in determining a time for sorting the plurality of eggs according to sex resulting in at least a plurality of single sex eggs (e.g., the plurality of single sex eggs being transported to the secondary location).

In yet another embodiment of the method, the time schedule is optimized such that the time schedule provides a time at which the plurality of eggs are transferred to the portable transport incubator such that the plurality of eggs arrive at the secondary location during the last day of an incubation cycle for the plurality of eggs, or in a time range as desired.

Yet further, still another method of incubation is described. The method includes providing an incubator that is movable from a primary incubation location to a secondary location. The incubator is controlled according to an incubation profile associated with a schedule used to adjust at least one condition of the incubator (e.g., the at least one condition may include at least one of humidity, carbon dioxide levels, and temperature in the incubator). The method further includes controlling incubation of a plurality of single sex eggs in the incubator during at least a portion of an incubation process as the incubator is moved between the primary incubation location to the secondary location.

In one or more embodiments of the method, the incubator may be a portable incubator transportable by a vehicle (e.g., a vehicle such as an aircraft, a rail based vehicle, a water based vessel, a vehicle that transports cargo, and a wheeled vehicle such as a semi-trailer truck), and/or the incubator may be a self-contained incubator that may include a power source and controller configured to carry out such incubation and/or one or more redundant conditioning components (e.g., redundant heating and cooling components).

A system for use in incubating a plurality of eggs according to one embodiment of the present invention includes a transportable incubation container configured to be moved from a first location to a second location (e.g., by a wheeled vehicle). The transportable incubation container includes a plurality of spaced apart heat exchange elements defining a plurality of regions within an interior of the transportable incubation container for receiving a plurality of eggs. The system further includes one or more egg holding structures configured to be positioned between at least two adjacent heat exchange elements for holding a plurality of eggs. A controller is configured for use in controlling at least one condition within the interior of the transportable incubation container according to an incubation profile for incubation of the plurality of eggs.

In one embodiment of the system, the system further includes one or more sensors to sense the at least one condition within the interior of the transportable incubation container and provide a sense signal representative of the at least one condition to the controller. The system further includes one or more conditioning components configured to be controlled by the controller based on the incubation profile and the sense signal representative of the at least one condition.

In another embodiment of the system, the one or more sensors may include at least one of humidity or moisture sensors, carbon dioxide sensors, and temperature sensors.

In another embodiment of the system, the one or more conditioning components may include at least one of air flow components to move air to one or more portions of the interior of the transportable incubation container, heat exchange components to adjust temperature in the interior of the transportable incubation container, one or more humidity control components for adjusting the humidity within the interior of the transportable incubation container, and one or more components configured to control carbon dioxide within the interior of the transportable incubation container.

In another embodiment of the system, the one or more conditioning components may include one or more redundant conditioning components (e.g., one or more redundant air flow components to move air to one or more portions of the interior of the transportable incubation container, one or more redundant heat exchange components to adjust temperature in the interior of the transportable incubation container, and one or more redundant humidity control components for adjusting the humidity within the interior of the transportable incubation container, and/or one or more redundant components configured to control carbon dioxide within the interior of the transportable incubation container).

In another embodiment of the system, the system may include a primary incubator to incubate at least partially a plurality of eggs according to an incubation profile (e.g., a profile associated with a schedule for adjustment of incubation conditions) and a sexing apparatus operable to determine the sex of the plurality of eggs after the plurality of eggs are at least partially incubated for use in sorting the plurality of eggs resulting in a plurality of single sex eggs to be provided in the one or more egg holding structures.

In yet another embodiment of the system, the controller may be configured to receive an incubation profile based at least in part on an incubation profile used to control incubation of the plurality of eggs at the primary incubation location (e.g., the system may include apparatus for transferring the incubation profile used to control incubation at the primary incubation location to the controller operable to control the at least one condition in the interior of the transportable incubation container).

In another embodiment of the system, the one or more egg holding structures may include one or more pallet structures in the interior of the transportable incubation container for holding a plurality of eggs in a fixed position as the transportable incubation container is moved from one location to another location, and/or one or more rack structures in the interior of the transportable incubation container for use in rotating the plurality of eggs as the transportable incubation container is moved from one location to another location.

Another system for use in the incubation of eggs according to one embodiment of the present invention is also described. The system includes a portable transport incubator used to move a plurality of eggs or poultry hatched from the plurality of eggs as the plurality of eggs are moved from a primary incubation location to a second location. The system further includes a processing apparatus operable to receive information associated with an incubation profile used to control incubation of a plurality of eggs at the primary incubation location and information associated with the secondary location where the plurality of eggs or poultry hatched from the plurality of eggs are to be transported. The processing apparatus is further operable to determine a time schedule for use in transferring at least a portion of the plurality of eggs to the portable transport incubator based on at least the incubation profile and the information associated with the secondary location.

In one embodiment of the system, the time schedule may further be for use in determining a time for sorting the plurality of eggs according to sex resulting in at least a plurality of single sex eggs (e.g., the plurality of single sex eggs to be transported to the secondary location).

In another embodiment of the system, the portable transport incubator may include a controller for use in controlling incubation of the plurality of eggs during transport based on the incubation profile used to control the incubation at the primary incubation location.

The above summary of the present invention is not intended to describe each embodiment or every implementation of the present invention. Advantages, together with a more complete understanding of the invention, will become apparent and appreciated by referring to the following detailed description and claims taken in conjunction with the accompanying drawings.

BRIEF DESCRIPTION OF THE DRAWINGS

The present invention is described with reference to the drawings in which:

FIG. 8 is a table of controllable conditions for use in describing the present invention.

DETAILED DESCRIPTION OF THE EMBODIMENTS

One or more embodiments of a transport incubator, and systems including such transport incubators, shall be described generally with reference to FIGS. 1-6. Further, various methods of incubation shall thereafter be described with reference to FIGS. 7-10.

One or more of the concepts and/or features shown according to the present invention can be used, for example, in the incubation of eggs (e.g., turkey eggs, duck eggs, chicken eggs, pheasant eggs, or any other type of eggs) as they are being transported or otherwise moved from one location to another (e.g., from a primary incubation location such as a hatchery to a secondary location such as a poultry farm where the about to be hatched eggs, or poultry hatched from such eggs, are to be raised or a second location such as where the poultry may be serviced). In other words, the portable and/or transportable nature of the incubator described herein breaks the tie to a primary hatchery and allows incubation to occur (e.g., after incubation is initially started in a primary incubation or hatching facility) at a different location other than the primary incubation facility (e.g., so as to create a second hatchery, at a grower location, on the road, in a cargo ship, at a delivery site, etc.).

One will recognize that the description and drawings herein provide various concepts and/or features that can be used separately and/or in combination according to the present invention. Further, features described with reference to one embodiment may be used in combination with any other embodiment described herein where suitable. For example, features described with reference to a system or transport incubator may be utilized in combination with and/or separate from features described herein with reference to incubation methods. For example, one or more rack structures and/or pallet structures may be used in the incubation methods described with reference to FIGS. 7-10, or such incubation methods may be used with other egg holding structures. Further, for example, the transport incubator utilized in an incubation method described with reference to FIGS. 7-10 may be of a completely different configuration than the incubator described with reference to FIGS. 1-3. As such, one will recognize that transport incubators according to the present invention may have one or more various different types of configurations and are not limited to those provided herein as long as they are suitable to provide the incubation functionality. However, certain configurations may be more beneficial in one or more circumstances than others.

Figure 1:
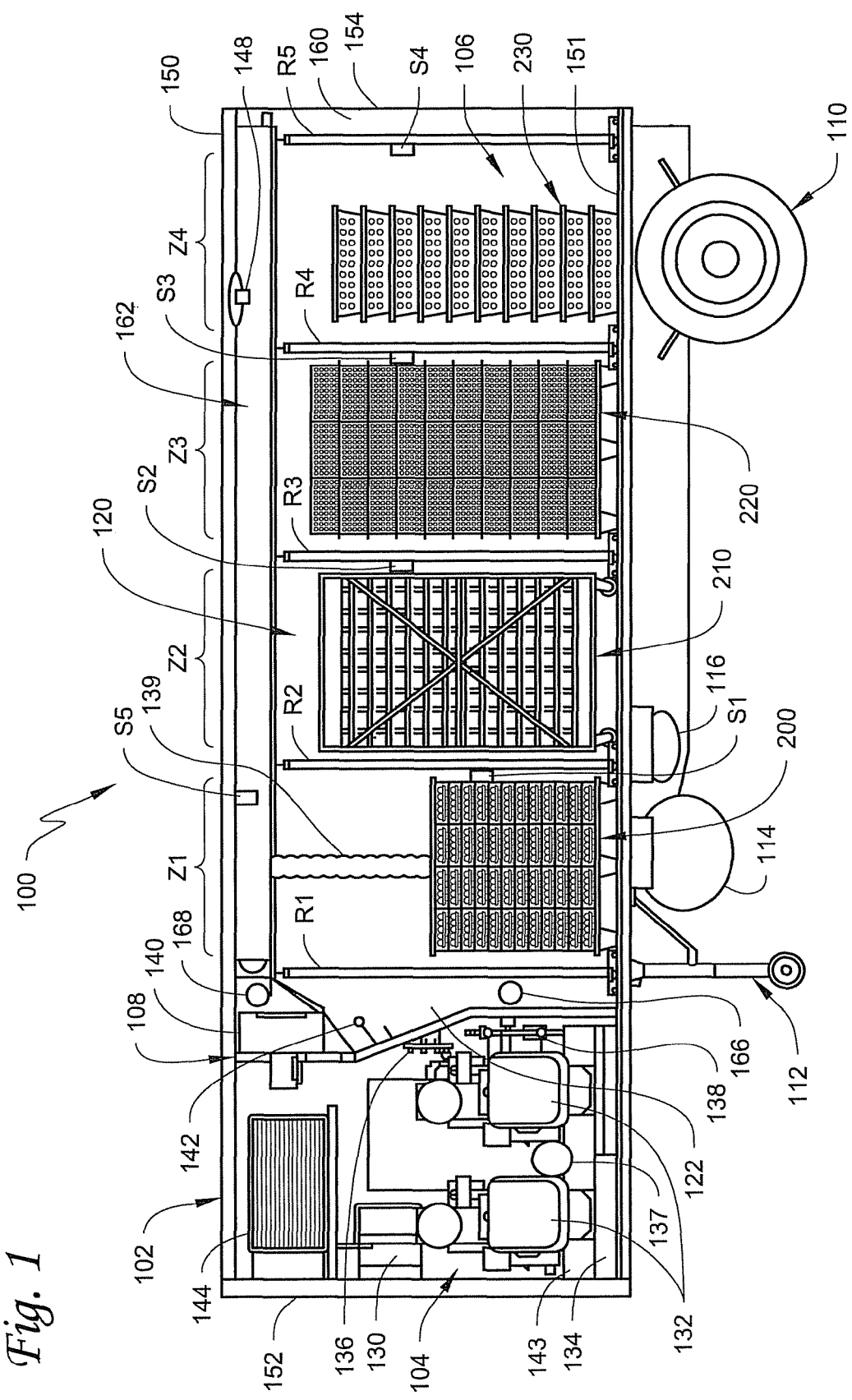
FIG. 1 is an illustrative side view of a transport incubator according to one exemplary embodiment of the present invention having at least one panel of the incubator removed to view the interior thereof.

FIG. 1 shows an illustrative side view of one embodiment of a transport incubator 100. The transport incubator 100 shown in FIG. 1 has one or more panels removed so as to view one or more various components therein and/or one or more embodiments of the contents that may be transported thereby according to the present invention.

As shown in FIG. 1, transport incubator 100 is configured as a semi-trailer including rear wheel axle structure 110 and further including legs 112 to support the semi-trailer when unattached to a semi-trailer truck (not shown). Although the transport incubator 100 is shown in FIG. 1 as a semi-trailer to be coupled to a semi-trailer truck, such a transport incubator 100 may be configured to be used or moved by one or more other vehicles. For example, the transport incubator 100 may be configured to be transported by way of an aircraft, a rail-based vehicle, a water-based vessel, a vehicle that transports cargo, and/or any other type of wheeled vehicle including a semi-trailer truck such as described herein. For example, the transport incubator 100 may be configured for transport by a boat, a cargo ship, a train, or any vehicle including a hitch mechanism. The present invention is not limited to any particular method of transporting the transport incubator. As such, the transport incubator may be of one or more various sizes and have one or more various structural configurations. In other words, one skilled in the art will recognize that the size and shape of a transport incubator to be transported by a train or a cargo ship may be of a different form than that transported by a semi-trailer truck. Further, the transport incubator may be configured to be removable from such a vehicle or may be integrated with the vehicle.

Generally, the transport incubator 100 is a portable incubator capable of being moved from a first location to a second location. In other words, the transport incubator 100 is not tied to a particular facility but rather may be operational during transport to a second location, and may further be operational at the second location. Yet further, in one or more embodiments, the transport incubator 100 may be used to provide an entire incubation process through hatch, at any desired location.

As shown in FIG. 1, transport incubator 100 includes a transportable incubation container 102. The transportable incubation container 102 includes a main body 150 extending from a first container end 152 to a second container end 154. The main body 150 generally includes a floor portion 151 capable of supporting one or more different loads.

An interior of the transportable incubation container 102 is separated by a separation structure 108 into a first container region 104 located at first container end 152 and a second container region 106 located at a second container end 154. For example, such a separation structure 108 may include any of a variety of materials to provide isolation of the environment 120 within second container region 106 from the environment within first container region 104. In one embodiment, the separation structure 108 includes an airtight sealed bulkhead formed of a suitable material (e.g., stainless steel, aluminum, or plastic).

The transportable incubation container 102 may be formed of any suitable material, such as sheet metals or plastics. At least in one embodiment, the transportable incubation container 102 is formed using airtight construction techniques. For example, surfaces of materials used to construct the airtight container are sealed prior to assembling the structure. For example, in one embodiment, each surface of all mating parts are sealant coated prior to assembly and fastener holes are sealant filled. Then, the components are assembled and torqued (or otherwise coupled), allowing full surface sealing of the container 102 (e.g., surface sealing that allows for control of the environment 120, such as temperature, to tight tolerances).

The second container region 106 is divided into a plurality of zones Z1-Z4 using a plurality of spaced apart heat exchange elements R1-R5. As shown in FIG. 1, zone Z1 is created between heat exchange elements R1 and R2, zone Z2 is created between heat exchange elements R2 and R3, zone Z3 is created between heat exchange elements R3 and R4, and zone Z4 is created between heat exchange elements R4 and R5. In addition, a forward air plenum 122 is created between the separation structure 108 and heat exchange element R1, and, likewise, an air return space 160 is created between heat exchange element R5 and the second container end 154.

As shown in FIG. 1, the heat exchange elements R1-R5 are spaced apart for receiving one or more various different load types as exemplarily shown therein. For example, a pallet structure 200 is shown for receiving eggs in zone Z1, an incubator rack structure 210 is shown for receiving eggs in zone Z2, hatching structures 220 are shown for receiving eggs in zone Z3, and poult transport baskets 230 are shown in zone Z4 for the transport of poults using the transport incubator 100. One will recognize that depending upon the incubation method and/or process used according to the present invention, the transport incubator 100 may transport any type of egg holding structure (e.g., rack structures 200, pallet structures 210, and hatching basket structures 220). For example, depending upon the time period in the incubation cycle during which eggs are transported, one or more types of the egg holding structures may be used according to the present invention. Further, for example, one or more various types of poult holding structures may also be transported according to the present invention and one or more methods described herein.

Figure 5:
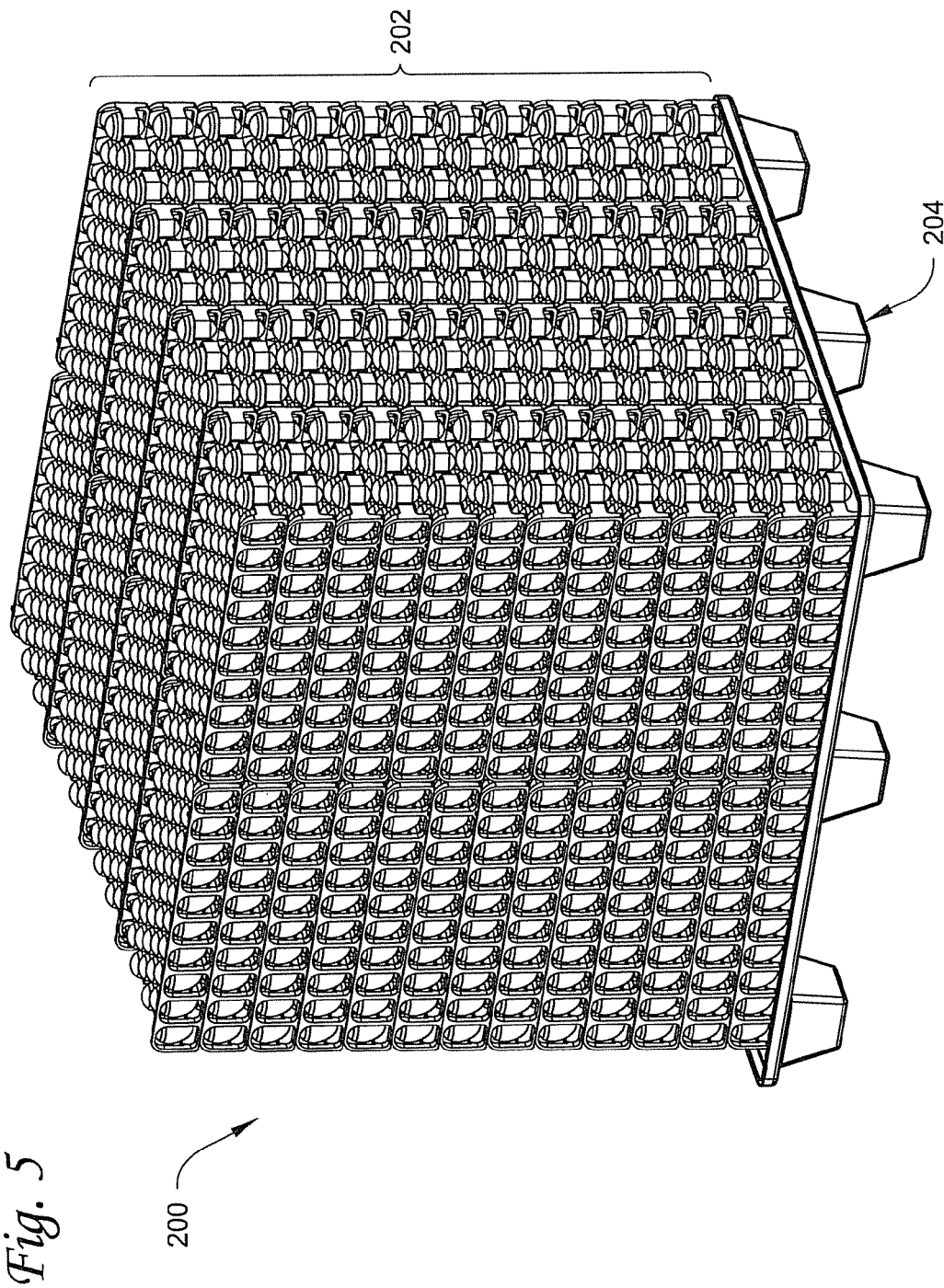
FIG. 5 shows a perspective view of one illustrative embodiment of a pallet structure that may be transported according to the present invention using a transport incubator such as shown in FIG. 1.

Although one exemplary pallet structure 200 for holding eggs in a fixed position is shown in FIG. 5, other configurations of pallet structures for holding eggs in a fixed position may be transported according to the present invention. The pallet structure 200 shown in FIG. 5 includes a pallet 204 (e.g., a structure capable of being moved using one or more various techniques, such as a forklift). One or more egg holding trays 202 may be provided on the pallet 204 for holding the eggs in a fixed position on the pallet 204 yet allowing air to flow through the trays for exchanging heat between the eggs and the air. One will recognize that the egg holding trays may be stacked in one or more various configurations on one or more different types of pallets. For example, one or more various pallet structures (e.g., including one or more trays) that may be used according to the present invention include those shown in U.S. Pat. No. 4,558,661 entitled "Egg holding flat," issued to Theilig et al. on 17 Dec. 1985; those shown in U.S. Pat. No. 6,129,505 entitled "Stacking trays," issued to Jupille et al. on 10 Oct. 2000; or any other numerous types of stackable configurations of egg holding trays such as pallet structures available from Jamesway Incubator Company Inc. (Cambridge, Ontario, Canada) under the trade designation SST Transport System.

Figure 6:
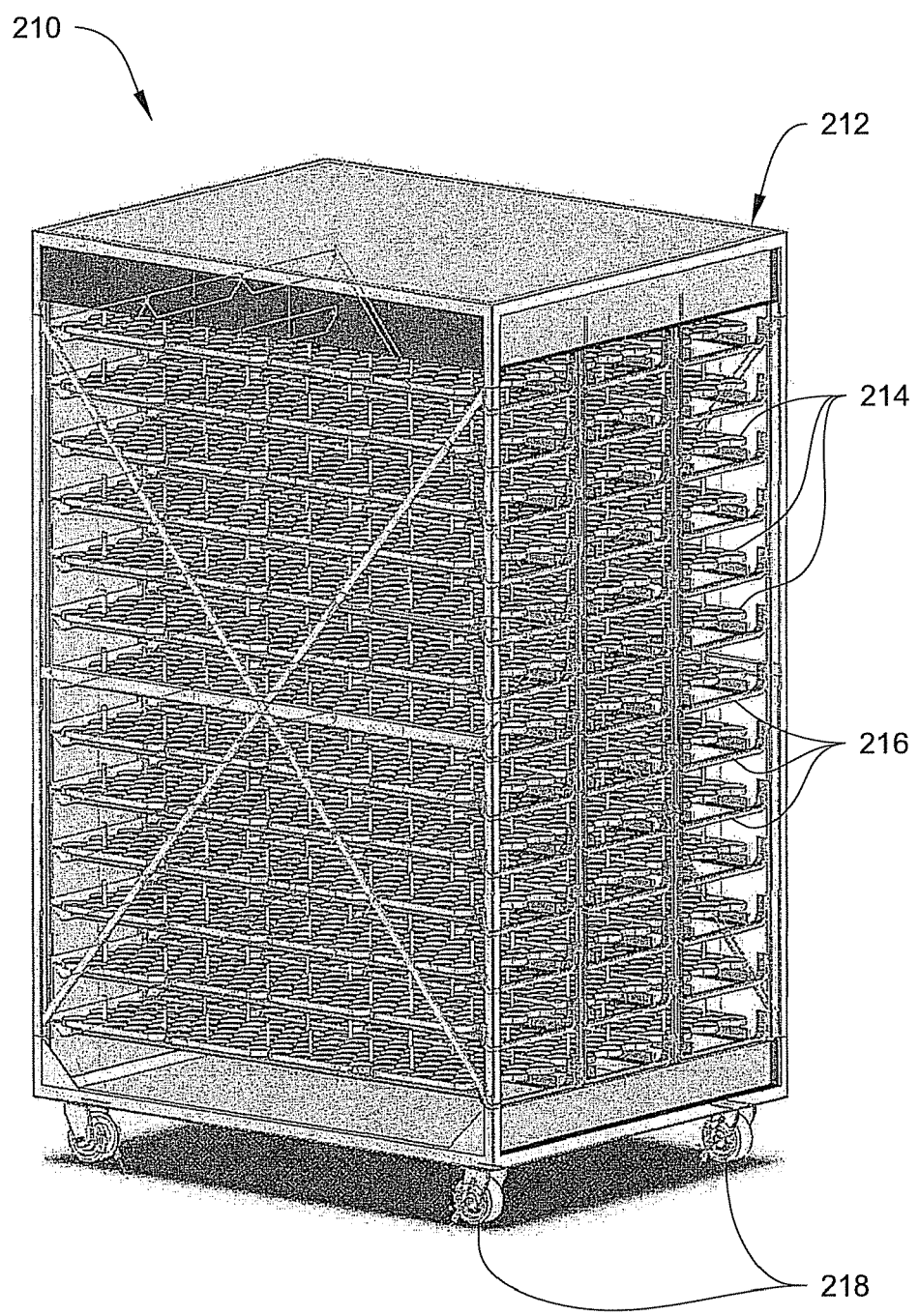
FIG. 6 is a perspective view of one illustrative embodiment of a rack structure that may be transported according to the present invention using a transport incubator such as the transport incubator shown in FIG. 1.

FIG. 6 shows one perspective view of a rack structure 210 that may be transported according to the present invention. However, any other types of rack structures capable of moving the plurality of eggs held therein as incubation occurs may be used (e.g., those that permit eggs to be rotated within the rack structure). The exemplary rack structure 210 shown in FIG. 6 includes a frame structure 212 movable upon a plurality of lockable rollers 218. The frame structure 212 is configured to receive a plurality of egg holding portions 214 that are configured to hold eggs and to work in conjunction with structure 216 to move the eggs relative to frame structure 212. For example, such movement of the eggs may include changing the angle of the axis of the egg within the frame structure 212 relative to horizontal. For example, rack structures that may be used according to the present invention include any configuration of structure where the eggs can be moved within the holding structure such as, for example, described in U.S. Pat. No. 6,196,160 B1 entitled "Egg incubating tray," issued to Pas on 6 Mar. 2001; or described in U.S. Pat. No. 3,147,737 issued 8 Sep. 1964 to Theilig, entitled "Apparatus for incubating eggs."

One will recognize that any suitable mechanism may be utilized to rotate and/or turn the eggs within the frame structure of the rack and the present invention is not limited to any particular rack structures. Yet further, one or more types of rack structures may include farm/incubator Racks available from Jamesway Incubator Company Inc. (Cambridge, Ontario, Canada), trolleys available from HatchTech Incubation Technowledge (Netherlands), or trolleys available from Chick Master (Englewood, N.J.).

The hatching basket structure 220 transportable by the transport incubator 100 may include any suitable configuration capable of holding eggs and allowing such eggs to hatch therein. For example, such hatching baskets are available from Chick Master (Englewood, N.J.) and KUHL Corporation (Flemington, N.J.).

Likewise, poult transport baskets 230 for the transport of poults may include any type of structure suitable for holding such poults. One or more of types of poult transport baskets tubs are available from Jamesway Incubator Company Inc. (Cambridge, Ontario, Canada), Chick Master (Englewood, N.J.) and KUHL Corporation (Flemington, N.J.).

The environment 120 in the plurality of zones Z1-Z4 is controlled by control components located throughout the transportable incubation container 102. A controller 130 (e.g., a digital controller) is located within first container region 104 to control the environment 120 and zones Z1-Z4. For example, the control components, in addition to the controller 130, may include one or more sensors (e.g., sensors S1-S5) that sense one or more conditions within the interior of the transportable incubation container 102 and provide a sense signal representative of such conditions to the controller 130. Further, such control components also include one or more conditioning components, such as, carbon dioxide injectors, moisture injectors, air conditioning units, heat exchangers, etc. At least in one embodiment, with the controller programmed to provide a controlled environment according to a particular incubation profile, the controller receives feedback from sensors and provides control signals to one or more conditioning components to control the environment to that set by the programmed incubation profile.

Although any type of sensors may be used, at least in one or more embodiments, sensors S1-S5 (e.g., each which may be representative of one or more sensors) may include humidity or moisture sensors, carbon dioxide sensors, and/or temperature sensors for use in the control of humidity, carbon dioxide content, and temperature within the environment 120 of the transportable incubation container 102. Sensor S1 is positioned within zone Z1, sensor S2 is positioned within zone Z2, sensor S3 is positioned within zone Z3, and sensor S4 is positioned within zone Z4 for sensing at least one condition within the respective zone and providing the same to controller 130. An additional sensor S5 is positioned within a return air plenum 162, as shall be described further herein, to sense at least one condition therein.

In other words, for example, the sensors S1-S5 provide feedback (e.g., thermal, moisture, and carbon dioxide feedback) to a computer controller 130 which controls one or more conditioning components. The one or more conditioning components are configured to be controlled by the controller 130 based on a set of input parameters (e.g., an incubation profile including one or more set points for the one or more conditions to be controlled) and one or more sense signals (e.g., feedback) representative of the one or more conditions monitored within the environment 120.

The one or more conditioning components within the transportable incubation container 102 may include any suitable conditioning components for controlling the desired controllable conditions in the environment 120, including, for example, temperature conditioning components, humidity conditioning components, and carbon dioxide conditioning components. For example, as shown in FIG. 1, carbon dioxide may be controlled within zones Z1-Z4. For example, one or more of the sensors S1-S5 may be actively monitored to detect carbon dioxide content in the zones and provide sense signals to computer controller 130. Controller 130 utilizing such sense signals from sensors S1-S5 with regard to carbon dioxide content may then provide for real-time control of the carbon dioxide content within zones Z1-Z4, based on an incubation profile with regard to the carbon dioxide content to be used in the incubation process, by providing for injection of carbon dioxide into the forward air plenum 122 via one or more carbon dioxide injectors 142 operatively connected to carbon dioxide reservoir 137 and controller 130.

In a like manner, the relative humidity within zones Z1-Z4 may be actively monitored by one or more of sensors S1-S5 which provide sense signals to controller 130 such that controller 130 may provide for real-time control of the relative humidity within zones Z1-Z4. For example, based on an incubation profile with regard to the relative humidity of the incubation process for the eggs, additional moisture may be provided within the environment 120 using a moisture injector 148 (e.g., positioned in return air plenum 162) and operatively connected to water storage tank 116 and controller 130.

Yet further, one or more of sensors S1-S5, and in at least one embodiment, at least one for each zone Z1-Z4, may provide thermal feedback to the controller 130. The controller 130 uses such information to control the heating and cooling of heat exchange elements R1-R5 continually adjusting to maintain tight environmental tolerances required for the incubation of the eggs being transported. For example, controller 130, based upon an incubation profile and the sensed temperatures in the various zones Z1-Z4, may control each heat exchange element R1-R5 to provide heat exchange with air as it is moved therethrough. Air movers 140 (e.g., a bank of fans) provide for the flow of air through the zones Z1-Z4 via the forward air plenum 122 as will be further described with reference to FIG. 3. As such, real-time control of temperature within zones Z1-Z4 can be accomplished.

For example, in one or more embodiments, heating and/or cooling can be accomplished using standard air conditioning components, including, for example, components such as cooling condensers 144, flat panel heat exchangers 136, system pumps 138, coolant tanks 143, or any other components necessary to carry out suitable air conditioning functionality (e.g., heating and cooling). At least in one embodiment, the transport incubator 100 includes redundant capacity cooling to protect from partial system failure (e.g., redundant cooling capacity such that, if one or more components of the system fails, the incubator can still be conditioned).

The heat exchange elements R1-R5 may each be separately plumbed and suitably connected for heating and/or cooling such heat exchange elements (e.g., refrigerant passing through each heat exchange element, with each element separately controllable to separately control the temperature in each of the zones Z1-Z4). As such, when air passes through each heat exchange element, the temperature of the air may be changed as desired. Detailed description of providing heating and/or cooling via the heat exchangers R1-R5 shall not be provided in any further detail herein as any conventional operative connectivity may be used to provide for heating or cooling the heat exchange elements R1-R5.

Figure 2:
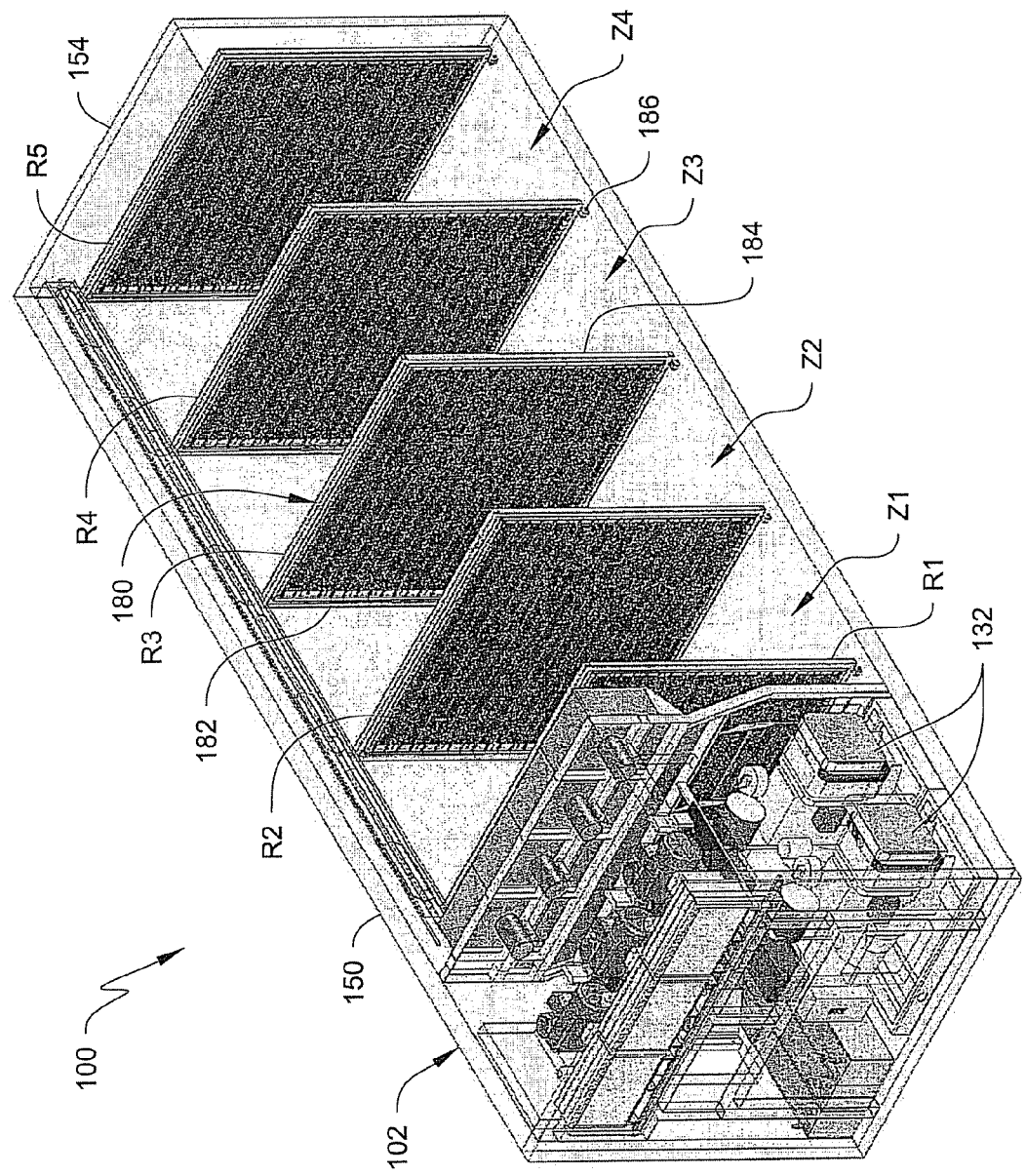
FIG. 2 is a perspective view of the exemplary transport incubator shown in FIG. 1 having various portions thereof removed such that heat exchange elements and zones created thereby are illustratively shown.

FIG. 2 shows a perspective view of the transportable incubation container 102 with various panels thereof removed such that the heat exchange elements R1-R5 can be further described. As described herein, the heat exchange elements R1-R5 are used to separately control the conditions within zones Z1-Z4. Each heat exchange element R1-R5 is generally of a radiator-type configuration. For example, such heat exchangers may be like those described in U.S. Pat. No. 6,708,755 to Meter on 23 Mar. 2004 and entitled "Method for controlling the temperature in a climate chamber and climatic device" and U.S. Pat. No. 7,021,552 B2 to Meter on 4 Apr. 2006 and entitled "Method and installation for controlling the temperature in a controlled-climate chamber."

As shown in FIG. 2, each heat exchange element R1-R5 is of a substantially rectangular configuration corresponding to a cross-section of the main body 150 of transportable incubation container 102. Each heat exchange element R1-R5 includes a heat exchange body portion 180 extending from a first side 182 to a second side 184. Each of the heat exchange elements R1-R5 are electrically, mechanically, and/or fluidly coupled to the control system and to heating and cooling components as would be required for their use in modifying temperature within environment 120.

Further, at one or more locations along the first side 182, each heat exchange element R1-R5 is pivotally coupled so as to allow the heat exchange elements R1-R5 to swing to the side. In other words, at least in one embodiment, the first side 182 of each heat exchange element R1-R5 is pivotally attached proximate one wall of the transportable incubation container 102. Movement of the heat exchange elements R1-R5 is further assisted by rollers 186 located proximate the second side 184 of each heat exchange element R1-R5 adjacent the floor 151. With the heat exchange elements R1-R5 being movable, the heat exchange elements R1-R5 can be swung to the side for ease in loading and unloading one or more egg holding structures positioned within the regions between adjacent heat exchange elements.

One will recognize that the transportable incubation container 102 includes one or more various access panels that may be opened to allow access to the interior of the transportable incubation container 102 (e.g., region 104 and 106). For example, the tail or end 154 of the transportable incubation container 102 may be opened and/or configured with appropriate doors for opening and/or closing. One will recognize that such access points to the interior of transportable incubation container 102 may be provided in any suitable location.

Generator sets 132, as shown in FIG. 1, provide the power necessary to carry out the implementation of a controlled environment according to the present invention. For example, such generator sets 132 may be operable using one or more different types of fuel (e.g., diesel fuel) as shown generally by fuel tank 114. Thermal mass 134 is provided adjacent generator sets 132 to provide for cooling thereof (e.g., heat sink).

Further, in one or more embodiments, the transport incubator 100 is designed to interface with commercial power. For example, such an interface may be useful for pre-transport stabilization and post-transport cleaning operations. Further, such an interface is designed to provide disaster recovery emergency power applications at a stop during delivery. The transport incubator 100 can be used as an interim stationary incubator should the need arise. At least in one embodiment, the transport incubator 100 is 100 percent back-up powered to minimize risk to poultry and maximize unit performance (e.g., dual generator sets).

Further, one or more exhaust vents and/or air intakes are provided to move air between the interior of the container 102 and the outside environment. For example, an air intake 168 is provided adjacent return air plenum 162 to provide fresh air into the forward air plenum 122 and an exhaust vent 166 is provided to exhaust air as necessary to control the quality of fresh air in the environment 120. Such air intakes and exhaust vents may also be provided under real-time control of controller 130. At least in one embodiment, the transport incubator 100 includes intake and exhaust controlled by proportional electronic valves allowing for a sealed poultry compartment that can be adequately controlled for incubation as opposed to allowing inlet and exhaust without such control. With control of the amount of inlet air provided into the environment 120 and control of the amount of air exhausted from the environment 120, a sealed compartment surrounding the environment 120 is provided. Such sealing of the environment is further enhanced by the construction of the compartment using the sealant on the components thereof prior to assembly.

In other words, control components described with reference to FIG. 1 provide for a controlled incubation environment (e.g., controlled according to an incubation profile for a plurality of single sex eggs transferred to controller 130 or according to one or more other input parameters provided thereto). For example, in one embodiment, the transport incubator 100 is configured with the capability of stationary incubator performance (e.g., a stationary incubation environment in a hatchery) in a mobile platform. Due to the mobility requirement and to meet the risk control to the product being transported, redundant design may be incorporated into power, cooling, heating, thermal storage, air handling controls, electrical distribution, and pumping. As previously described, one element of control is provided by the airtight construction of the product zones by using complete surface sealing prior to structural assembly of the transportable incubation container 102.

To meet the environmental controls requirement imposed by an incubation profile for a plurality of eggs, the controller 130 is configured to maintain each zone Z1-Z4 by way of direct sensor feedback to adjust the temperature treatment of the air in the zone for the product by influencing the previous heat exchange element (e.g., one of elements R1-R5) positioned relative to the respective sensor (e.g., sensor S1-S5). For example, as the air is moving from element R1 to R5, element R1 is influenced (e.g., adjusted) based on the signal sensed by S1. Yet further, for example, in one embodiment, the zones Z1-Z4 are averaged in real-time while continually being adjusted to the profile target by the controller 130. One will recognize that various control techniques may be used to provide for thermal control in the environment 120 using the heat exchange elements R1-R5 and sensors S1-S5.

Further, in one or more embodiments, eggs being transported and being repositioned, moved, or turned, cause airflow variations by varying the presented profile of egg trays to the airflow. As such, continual temperature adjustments may be needed to maintain stability in such a circumstance. For example, this is the case when rack structures are being transported within the transport incubator 100.

Still further, at least in one embodiment, product being transported is typically positioned to direct airflow through the product to optimize the convection heat transfer. Air gaps which allow bypass of the airstream may be baffled or blocked to direct airflow through the product (e.g., the eggs in egg holding structures). For example, one such baffle structure 139 is shown within zone Z1 of FIG. 1. In this illustrative embodiment, this baffle structure may be configured in an inflatable manner to direct airflow through the pallet structure 200 holding the eggs (e.g., as opposed to letting the air flow over the top of the structure 200. Further, other baffles structures may be used such as, for example, accordion structures, sliding structures, or any other expandable structure. One will recognize that any sort of structure may be positioned within and/or adjacent the walls of the transportable incubation container 102 and the loads being transport to attempt to change direction and/or control airflow through zones Z1-Z4 (e.g., force the flow of air through the structures holding the eggs).

Figure 3:
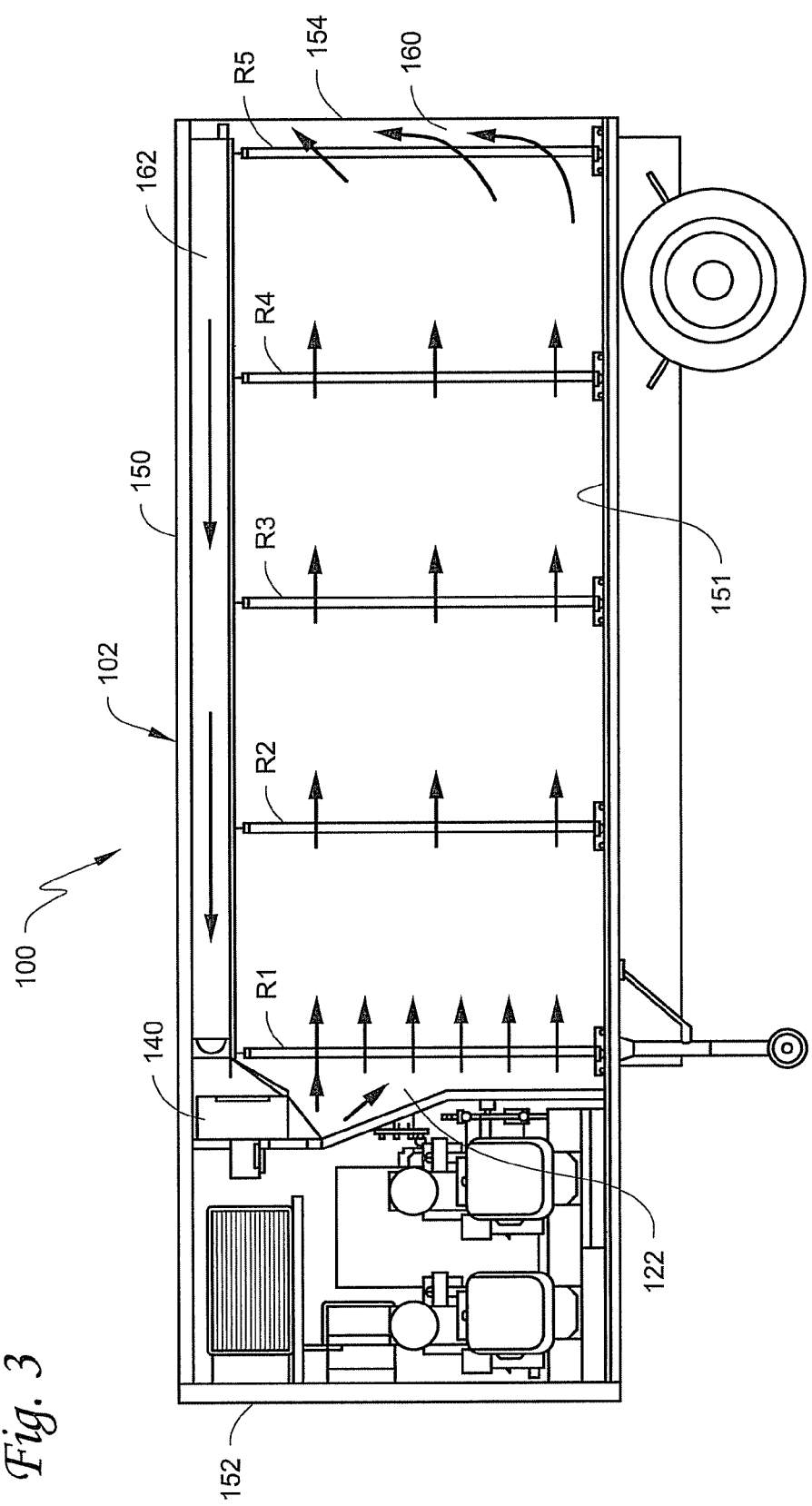
FIG. 3 is an illustrative side view diagram of the transport incubator shown in FIG. 1 with various elements thereof removed and which shows one embodiment of an airflow pattern for the exemplary transport incubator.

FIG. 3 shows one embodiment of an airflow pattern in the transport incubator 100. However, it will be recognized that various airflow patterns (e.g., airflow in the opposite direction) may be used to accomplish control of the incubation environment within the interior of the transportable incubation container 102. As shown in the illustrative embodiment of FIG. 3, a bank of fans 140 is used to receive returned air through return air plenum 162 (e.g., which may be duct work lying along the ceiling of the container 102, a false ceiling in container 102, or any other suitable structure for returning the air to the fans 140). The bank of fans 140 causes air to move into forward air plenum 122 and through the heat exchange elements R1-R5. Return air, after moving through heat exchange element R5, enters air return space 160 between heat exchange element R5 and second container end 154 and is forced upward into return air plenum 162 and back to the bank of fans 140.

At least in one embodiment, airflow is provided by multiple fans capable of exceeding airflow requirements and meeting the redundant design for safety and risk reduction. The airflow is controlled by controller 130 to meet incubation profile parameters.

One or more of the conditioning components may be positioned as necessary to condition the airflow to provide a controlled environment. For example, carbon dioxide and relative humidity may be monitored in different locations as the air is flowing. Adjustment injections may be made at remote locations relative to the sensor locations (e.g., a distance apart to allow turbulent mixing and aid in the balancing and control of the environment). For example, as shown in FIG. 1, the water injector 148 is positioned in the return air plenum 162 so as to provide for proper mixture within the air prior to providing the air into the zones Z1-Z4 where sensors may be positioned.

At least in one embodiment, the cross-sectional area of the heat exchange elements R1-R4 allow for less than fan capacity. As such, a positive pressure head is built at the forward air plenum 122 and laminar flow characteristics in progressive zones Z1-Z4 are created.

In one or more embodiments, redundant control components may be included to reduce the risk of environmental control failure within the interior of transportable incubation container 102. For example, one or more redundant airflow components to move air to one or more portions of the interior of the transportable incubation container 102 may be provided, one or more redundant heat exchange components to adjust temperature in the interior of the transportable incubation container 102 may be provided, and one or more redundant humidity control components for adjusting humidity within the interior of the transportable incubation container 102 may be provided, as well as one or more redundant components configured to control carbon dioxide within the interior of the transportable incubation container 102 may be provided. Yet further, such redundancy may be provided with respect to the power source as well.

Yet further, one will recognize that the first container region 104 and the second container region 106 may be configured as modular units such that either may be replaceable and connected to one another. For example, the first container region 104 may be provided in a modular form such that if a repair is needed thereon, a replaceable modular unit can be connected and suitably coupled to second container region 106.

Figure 4:
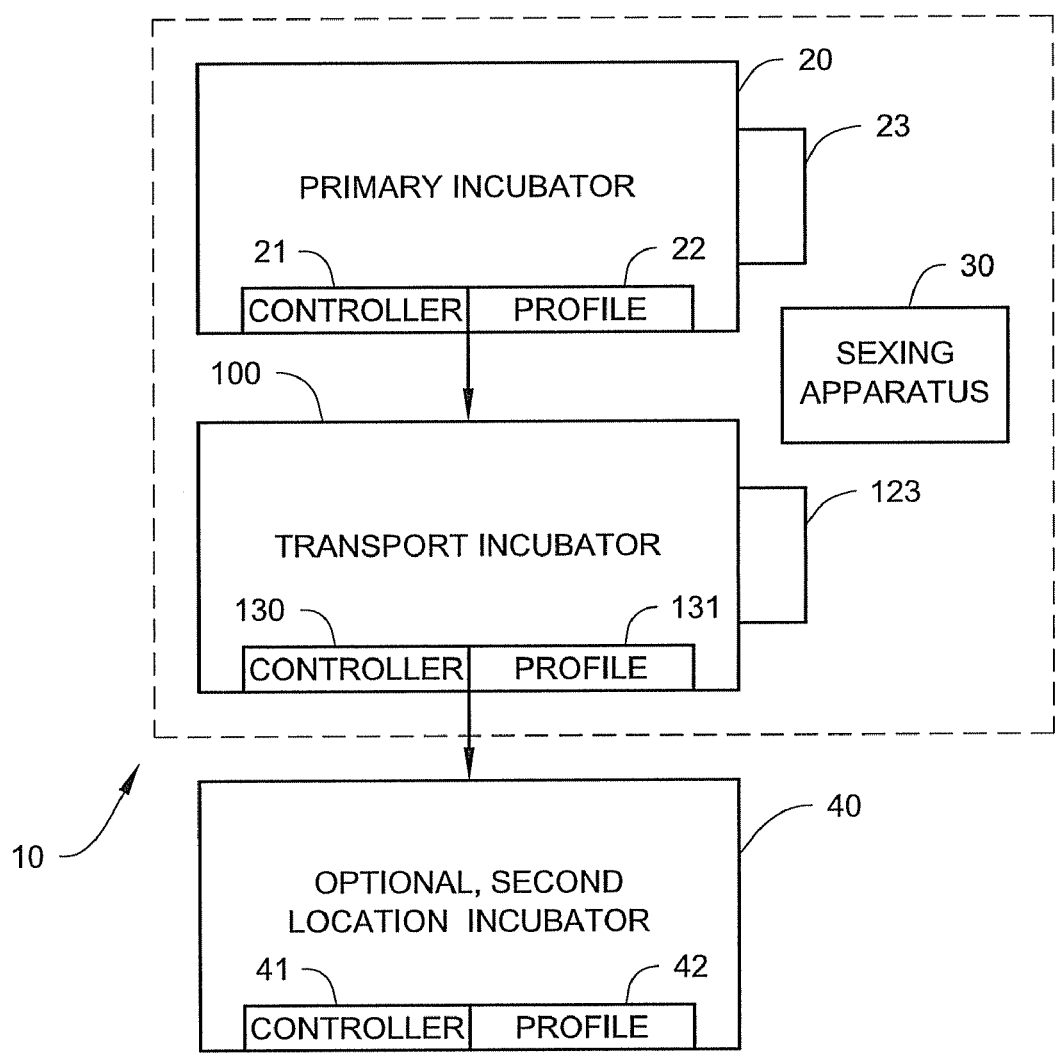
FIG. 4 shows a block diagram of one embodiment of an exemplary incubation system 10 including at least a primary incubator and a transport incubator, such as the transport incubator shown illustratively in FIG. 1.

FIG. 4 shows a block diagram of an incubation system 10 according to one embodiment of the present invention. The incubation system 10 includes a transport incubator such as transport incubator 100 shown in FIG. 1. Further, the incubation system 10 may include a primary incubator 20 located at a primary incubation location (e.g., at a hatchery). Generally, the primary incubator 20 (e.g., an incubator at a hatchery) may be any incubator (e.g., stationary incubator tied to a hatchery facility) for use in the incubation of eggs. For example, the primary incubator 20 may include a controller 21 for controlling the environment within the primary incubator according to an incubation profile 22.

The primary incubator 20 may be any suitable and conventional incubator, such as, for example, an incubator available from HatchTech Incubation Technowledge (Netherlands) or available from Chick Master (Englewood, N.J.).

The primary incubator 20 may be used to incubate the eggs in a conventional manner. For example, the eggs may be set in the incubator with the controller 21 controlling the environment of the incubator according to an incubation profile 22. For example, the controller 21 (e.g., a digital controller) is configured to execute a performance program to control the environment within the primary incubator 20 according to a particular incubation profile 22. The incubation profile 22 is generally based upon breed (genetics), hold time, statistical performance, and incubator characteristics. The controller 21 generally controls airflow through the incubator, the temperature within the incubator, humidity within the incubator, and carbon dioxide within the interior of the incubator 20.

Generally, according to at least one embodiment of the present invention, the control program controlling the interior of the primary incubator 20, according to incubation profile 22, is initiated when the eggs are provided in the primary incubator 20 and the incubation is performed therein until such eggs therefrom, are to be transported in transport incubator 100.

As previously described herein, transport incubator 100 includes controller 130 configured to control the interior environment 120 of the transportable incubation container 102 according to an incubation profile 131. The incubation profile 131 may be provided to the transport incubator 100 in one or more various manners. For example, the incubation profile 131 may be selected from one or more profiles programmed for the controller 130, or, for example, the incubation profile 131 may be provided by user input of various parameters or set points for one or more conditions of the environment to be controlled (e.g., set points to which the controller 130 controls the environment 120 within the transportable incubation container 102). Further, for example, the incubation profile 22 used by the primary incubator may be copied and transferred to the transport incubator 100 such that controller 130 uses substantially the same profile 22 as used in the primary incubator. In other words, incubation profile 131 may be substantially the same profile as incubation profile 22.

In one or more embodiments, for example, when transport duration is relatively short (e.g., less than a day), the incubation profile may be a single set of values (e.g., set points) for the conditions being monitored in the transport incubator since the desired values may not change within such a short period of time. Such values may be input to controller 130 by a user or transferred from the primary incubator.

The incubation system 10 also includes one or more monitoring apparatus so as to allow the user to monitor the incubation process. For example, a monitoring apparatus 23 may be used to monitor the primary incubation process at a primary incubation location. Likewise, a monitoring apparatus 123 may be associated with transport incubator 100 so as to monitor the environment 120 within the transportable incubation container 102. For example, monitoring apparatus 123 may be located within the cab of a semi-trailer truck for monitoring transport incubator 100 when it is configured as a semi-trailer and/or controlling the environment 120 in the container 102. In other words, dual controls may be provided in one embodiment (e.g., controls in the transport incubator container and also in the vehicle pulling the container for real time monitoring and/or environment control within the container 102). Any suitable additional controller may be used and the present invention is not limited to any particular configuration of provided such dual control.

Optionally, the incubation system 10 may further include a second location incubator 40. This second location incubator 40 may include a controller 41 for use in controlling the environment within the second location incubator according to an incubation profile 42. The incubation profile 42 may be provided to controller 41 in substantially the same manner as provided to transport incubator 100, or the incubation profile used by transport incubator 100 may be copied and transferred to and used as incubation profile 42.

One will recognize that the controllers described herein may include any controller (e.g., eletromechanical or digital controller) suitable for providing the functionality of controlling the environments within the one or more various incubators (e.g., receive sensor inputs and provide outputs based thereon and based on incubation profile set points for the incubation process). The present invention is not limited to any particular controller or control system. Each controller may include, for example, one or more digital processors configured to execute a control program. The controller is generally programmable with a plurality of incubation profiles to be implemented by the incubator for controlling the environment therein. Further, the controller may be programmable with various selectable incubation profiles using, for example, a personal computer executing controller programming software (e.g., an application software program).

Any suitable controller may be used and various incubator controllers are available. However, at least in one embodiment, one or more multiple zone controllers such as those available from HatchTech Incubation Technowledge (Netherlands) used to control an incubator sold under the Micro-Climer trade designation. For example, such a controller may be used and/or modified to provide the functionality described herein.

At least in one or more embodiments, one or more of the incubation profiles, and/or portion of the profile (e.g., a set of set points for a particular period of time in the incubation cycle) may be copied from and/or downloaded to the controller. In such a manner, in one or more embodiments, the incubation profile for an incubation cycle may be transferred from one controller to another, or a set of set points may be copied and/or transferred from one controller to another.

One will recognize that the controller 130 of the transport incubator 100 may be programmed to run a complete incubation profile (e.g., provide for incubation during the entire incubation cycle), or may be programmed to run only a portion of the incubation profile (e.g., provide control of an incubator environment 120 for only a day or multiple days during the incubation cycle). Further, the incubation profile of the transport incubator may only include a single set of set points for controlling the incubator environment over a period of time (e.g., a single day where generally the conditions are maintained and not adjusted).

Further, one will recognize that incubation in the transport incubator 100 may be initiated at any time during the incubation cycle (e.g., at any point in the incubation profile). As such, the eggs may be transferred to the transport incubator 100 at any time during the incubation cycle, and the controller 130 can be used to initiate control of the environment to the conditions desired (e.g., as set forth in the incubation profile) at that point in the incubation process.

The incubation system 10 further includes a sexing apparatus 30 operable to determine the sex of a plurality of eggs after the plurality of eggs are at least partially incubated using the primary incubator 20. The sexing apparatus 30 is provided for use in sorting the plurality of eggs by gender resulting in a plurality of single sex eggs that may be transported using transport incubator 100.

The sexing apparatus 30 may include any type of sexing apparatus suitable for determining the sex of avian species while in the egg. For example, a non-invasive sexing apparatus for determining the sex of avian species while in the egg which use magnetic resonance imaging is described in U.S. Pat. No. 6,029,080 entitled "Method and apparatus for avian pre-hatch sex determination," issued to Reynnelles et al. on 22 Feb. 2000. However, any sexing apparatus capable of determining the gender of the egg may be used according to the present invention. For example, other sexing apparatus for sexing eggs may include the use of ultrasound such as described in U.S. Pat. No. 6,805,244 entitled "Ultrasound quality inspection of avian eggs," issued to Toelken on 19 Oct. 2004. As a result of using the sexing apparatus 30 on the plurality of eggs at least partially incubated in primary incubator 20, a resulting plurality of single sex eggs can be provided for transport in transport incubator 100 (e.g., one sex can be transported in one direction and the other sex can be transported somewhere else).

At least in one embodiment of the system shown in FIG. 4, the transport incubator 100 is moveable using a wheeled vehicle (e.g., a semi-trailer truck) with the incubation profile 131 being transferred from the primary incubator 20 to the controller 130 of the transport incubator 100 for use in controlling the environment therein. The transport incubator 100 may be a self-contained incubator including a power source and controller, along with one or more redundant components for controlling one or more conditions of incubation therein (e.g., redundant cooling or heating components, humidity conditioning components, and carbon dioxide conditioning components).

FIG. 8 shows a table of one or more different control parameters (e.g., temperature, humidity, carbon dioxide content, and air cycling) that are controlled to within particular tolerances to achieve desired results in one or more time periods during the production of poultry (e.g., incubation, hatch, poult transport, etc.). For example, in one or more embodiments, temperature, relative humidity, carbon dioxide content, and air cycling within the transport incubator is controlled (e.g., via controller 130) to within the ranges shown therein and as would be set forth by the incubation profile. For example, during incubation (e.g., days 1-25 of incubation for a turkey egg), the temperature is controlled in the temperature range as shown (+/−) 0.5 degrees, relative humidity is controlled in the range as shown (+/−) 5 percent, carbon dioxide content is controlled in the range as shown (i.e., 1000 ppm to 5000 ppm (with a target range between 3000 ppm to 4500 ppm)), and air cycling is continually controlled to provide 14000 cubic feet per minute (cfm) with the range of air cycling generally between 100 percent of this volume flow to 50 percent of this volume flow (e.g., depending on the heat produced by the product being transported, for example, eggs later in the cycle or earlier in the cycle). Likewise, exemplary value ranges for control parameters for hatching (e.g., day 25 to day 28 for a turkey egg) and poult transport are provided in the table of FIG. 8. For example, and further to the table, for poult transport, a target of 4000 ppm is generally desired and air cycling is generally provided at 100 percent.

Generally only the temperature is pre-conditioned in the transport incubator before the eggs are loaded and transported in one exemplary embodiment. However, it will be recognized that other conditions may be controlled ahead of time as well.

Figure 7:
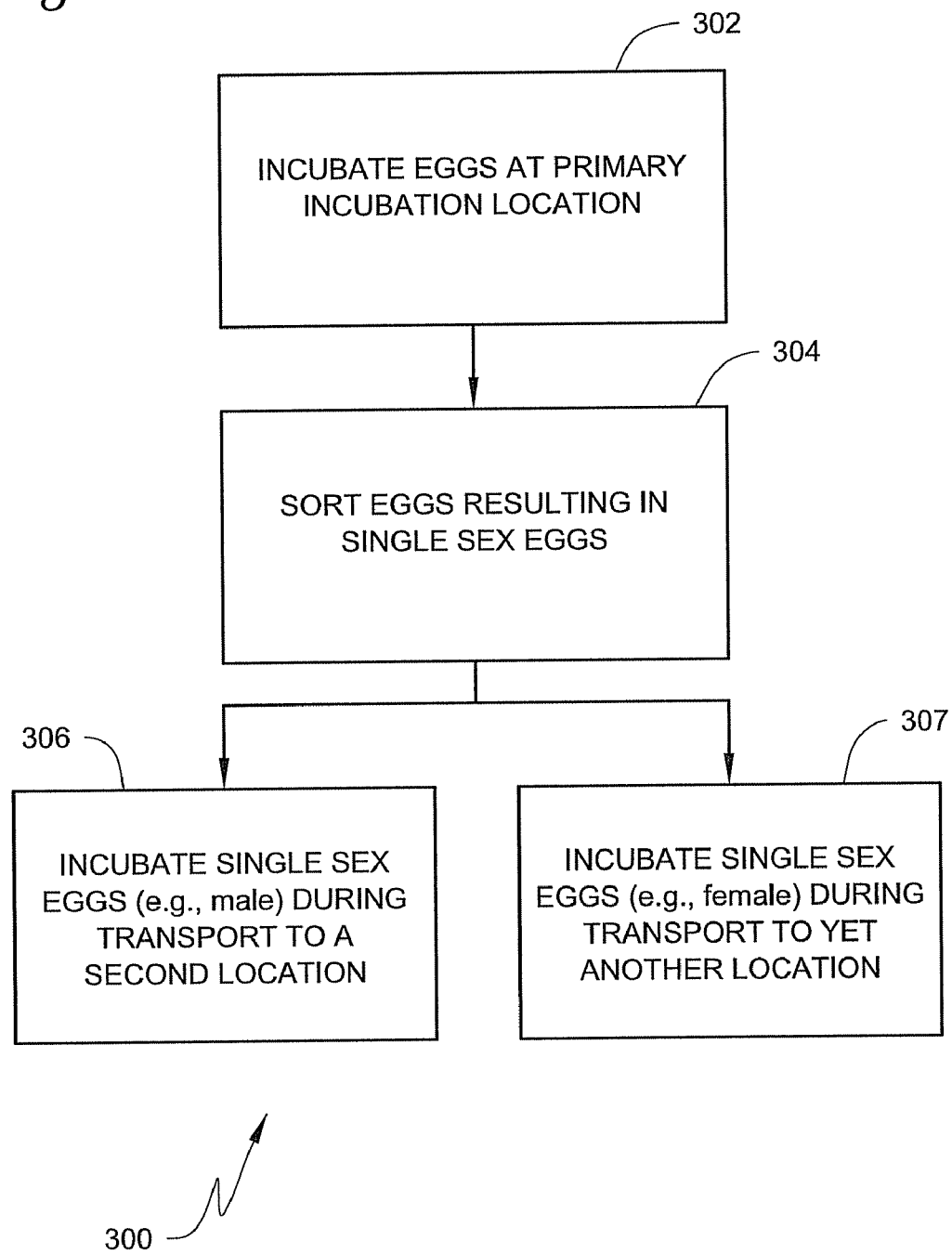
FIG. 7 shows a flow diagram of one embodiment of an incubation method according to the present invention.

FIG. 7 shows one exemplary embodiment of an incubation method 300 that may be implemented by an incubation system that includes one or more features of the system 10 shown in FIG. 4. Generally, the incubation method 300 includes incubating eggs at a primary incubation location (block 302), sorting such eggs (e.g., eggs at least partially incubated at the primary incubation location) resulting in single sex eggs (block 304), and thereafter incubating the single sex eggs during transport to a second location (block 306).

Generally, the sorting by sex results in separated male and female single sex eggs, the male single sex eggs may be processed in one manner and the female single sex eggs may be processed in another manner. For example, as shown in FIG. 7, one sex (e.g., male) may be transported to a second location as shown by block 306, and optionally, the other sex (e.g., female) may also be transported to another location as shown by block 307 or processed in some other manner.

As used herein, incubation of eggs during transport to a second location generally refers to incubation either while the eggs are moving from one location to another, incubating eggs during one or more stops (e.g., temporary stops) during transport of eggs from one location to another location, or incubating such eggs at the second location.

One will recognize that the process flow for production of poultry, including the incubation of a plurality of eggs, may vary depending on many different factors. For example, during an incubation cycle (e.g., from when eggs are laid to when they hatch) the process flow will vary depending on a variety of factors such as genetics, hold time of the eggs prior to the transfer to an incubator, statistical performance of previous incubation processes, and one or more characteristics of an incubator used to perform the incubation of the plurality of eggs. Many of such factors are taken into consideration when an incubation profile is set for a plurality eggs. It is noted that transport using a transport incubator according to the present invention may occur at any time during the incubation cycle (e.g., including during hatch). However, transport during one or more particular periods of time may be more beneficial than others (e.g., during the last 10 days of the cycle before hatch, such as for turkeys).

One will recognize that the incubation profile, including the duration of the incubation cycle, may be different for different types of poultry (e.g., 28 day cycle for turkey eggs and duck eggs and a 21 day cycle for chicken eggs). The present invention is not limited to any particular types of poultry (e.g., chickens, pheasants, etc.), although it may be more beneficial for one type when compared to another.

At least in one embodiment, and as described with reference to FIG. 7, the plurality of eggs at least partially incubated at the primary location are sexed and then they may be incubated using a combination of one or more of a variety of continued incubation steps. Some of such incubation steps may be performed in a transportable incubator as the eggs are moved to a new location, while others may not be performed in the transportable incubator (e.g., they may still be performed at the primary location in the primary incubator).

It will be recognized that any number of process flows using a transport incubator such as the transport incubator 100 shown in FIG. 1 may be possible according to the present invention as generally set forth in FIG. 7. For example, the incubation profile for use in the incubation of a plurality of eggs to be incubated may be substantially different for different eggs (e.g., different incubation cycle duration for different types of poultry) dictating a different process flow, a secondary location for delivery of the single sex eggs may be different dictating a different process flow (e.g., a closer location allowing for more incubation at the primary incubation location or hatchery as opposed to while in transport), certain facilities available at the secondary location might dictate that the eggs be hatched in hatch baskets using transport incubator 100, etc.

However, at least in one embodiment, the pluralities of eggs are at least partially incubated at a primary incubation location. Following the partial incubation, the plurality of eggs can be sorted according to sex and at least a plurality of single sex eggs are incubated while being transported to a second location. At least in one embodiment, incubation of the eggs at the primary incubation location (block 302) is controlled according to an incubation profile and the incubation during transport is further controlled based upon the incubation profile used to control the incubation at the primary incubation location (e.g., the controller of the transport incubator may be programmed using the same incubation profile as the primary incubator, a user may input desired set points corresponding to a portion of the incubation profile into the controller, the entire incubation profile of the primary incubator may be copied and transferred to the controller of the transport incubator, etc.).

Figure 9:
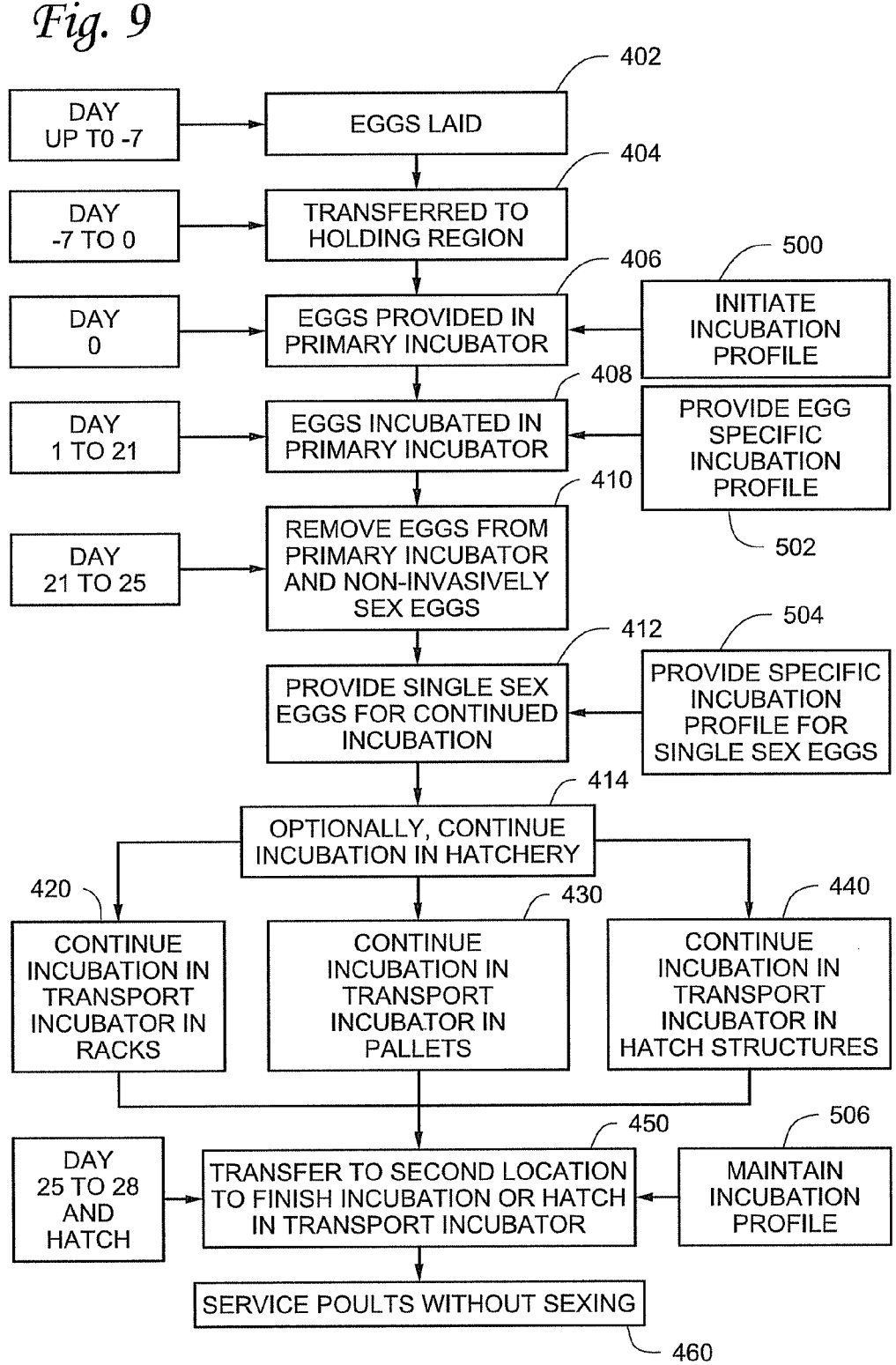
FIG. 9 is a more detailed flow diagram of one or more embodiments of incubation methods according to the present invention.

FIG. 9 shows a more detailed incubation process 400 for turkey eggs (e.g., those eggs having a 28 day incubation cycle) illustrating one or more various embodiments of utilizing a transport incubator such as the transport incubator 100 shown and described with reference to FIG. 1. One skilled in the art will recognize that similar processes apply to other types of eggs having the same or different incubation cycles, such as chicken eggs. Only a 28 day incubation cycle is described in more detail herein merely for simplicity purposes.

As shown in FIG. 9, up to seven days before initiation of an incubation process, eggs are laid (block 402). During those seven days prior to the start of incubation, the eggs may be transferred to a holding region (block 404).

At the start of incubation (day 0), the eggs are provided in a primary incubator at a primary incubation location (block 406). The primary incubator is initiated such that the environment therein is controlled according to an incubation profile suitable for incubating the eggs in the primary incubator (block 500) (e.g., an incubation profile available in controller 21 is selected or an incubation profile is otherwise provided to the controller).

The eggs are incubated in the primary incubator (e.g., primary incubator 20 of FIG. 4) during, for example, the first 21 days (block 408). As indicated by block 502, the primary incubation, which at least partially incubates the eggs, is performed according to an egg-specific incubation profile as initiated by block 500. As previously described herein, the incubation profile for the particular eggs being incubated in the primary incubator (block 408) may be based upon breed or genetics of the plurality of eggs, hold time prior to being positioned within the primary incubator, statistical performance of prior incubation processes, and/or the characteristics of the primary incubator itself. However, other factors may be considered as well. In one embodiment, at least during a portion of the first 20 days of the incubation cycle, the eggs are turned or rotated in rack structures, such as those described herein.

In the illustrative embodiment shown in FIG. 9, sometime during the incubation process, for example, during days 21 through 25, the plurality of eggs are removed from the primary incubator and non-invasively sexed to determine the particular gender of the species while in the egg. Single sex eggs are then provided for continued incubation depending upon their gender (block 412).

For example, the incubation profile for the single sex eggs may be updated (block 504) or tailored to change the controlled condition set points for the incubation process due to the fact that only single sex eggs are being incubated together. For example, the incubation profiles may be tailored for each gender (e.g., such profiles may be different for each gender) due to the varying metabolic characteristics of male and female eggs/poults (e.g., one sex may give off more heat than the other during incubation).

Depending upon when the eggs are non-invasively sexed and sorted, and also depending upon when the single sex eggs are to be transferred to the second location to finish incubation or hatch in the transport incubator (block 450), incubation may follow one or more various process flows. For example, following the non-invasive sexing of the eggs (block 410), single sex eggs may be repositioned in egg holding structures (e.g., racks, pallets, etc.) for continued incubation in the hatchery (block 414). Depending upon the time within the incubation cycle, such continued incubation in the hatchery (block 414) may include continued incubation in the hatchery in one or more rack structures (e.g., rack structures wherein the eggs are rotated, turned, or otherwise moved therein), or may include continued incubation in pallet structures in the hatchery or primary incubation location (e.g., pallet structures where the eggs are in a fixed, or non-movable, position within the structure).

Yet further, at least in one embodiment, for example, during day 21 through day 26 of the incubation cycle, the incubation of the single sex eggs can be continued in the transport incubator in pallet structures as they are being transferred to a second location (block 430). For example, generally, if racking is completed in the hatchery (e.g., during days 1 to 20), then transport of the eggs in the transport incubator to the second location (e.g., servicing locations or growing farms) may be done in pallet structures, assuming, for example, that the final days (e.g., day 25 through 28) have not yet been reached and that hatching of the eggs will not occur in the transport incubator.

In another embodiment, continued incubation in the transport incubator of the single sex eggs may occur in rack structures (block 420). For example, if racking of the eggs is not completed in the primary incubator at the primary incubation location, then racking may be continued in transport to the second location with the single sex eggs being provided in rack structures (e.g., such as during day 1 to day 20 of the cycle).

Yet further, in another embodiment, the continued incubation of the single sex eggs in the transport incubator during transport to a second location may occur with the single sex eggs in hatch structures (e.g., hatch baskets) wherein the eggs may hatch into poults. For example, if racking is completed within the primary incubator and the eggs are in, for example, days 24 to 26 of the incubation cycle, then hatch structures may be transported by the transport incubator to assure that the eggs being transported can hatch in a proper structure for holding the poults.

During transport to a second location (e.g., a rearing farm), incubation is continued according to the incubation profile as controlled by the controller of the transport incubator. For example, if the eggs are in hatching baskets in the transport incubator, the environment in the transport incubator is controlled to conditions for hatch according to the incubation profile.

Yet further, during, for example, day 25 to day 28, the eggs are generally provided in hatch structures. For example, either the eggs transported in pallet structures are provided or transferred to other hatching structures at the second location and incubation is finished, or alternatively, the incubation is completed in hatch structures transported by, and even within, the transport incubator (block 450). In either case, hatch of the single sex eggs occurs apart from the primary hatching facility. The completion of the incubation or hatch is performed in a controlled environment according to the incubation profile for the eggs (block 506). For example, if the transport to the second location is performed early in the incubation cycle, an incubator at the finishing facility or another hatchery may be used which is controlled to the incubation profile for the eggs, or the incubation may be finished within the transport incubator which includes an environment controlled according to the incubation profile.

Once the eggs are hatched, the poults may be serviced (e.g., toes, claws, beaks may be treated or poultry may be given inoculations) without sexing (block 460). In other words, for example, single sex eggs may be serviced at a remote facility without the need to perform a sexing operation (e.g., a sorting operation based on sex).

It will be apparent to one skilled in the art upon reading the description provided herein that the process flow of FIG. 9 illustratively shows how the eggs are incubated according to an incubation profile at a primary incubation location, then sexed and provided for hatching or finishing differently depending on the sex. Each sex can be finished at the hatchery, partially finished at the hatchery and then transported using the portable transport incubator described herein, or transported using the portable incubator described herein directly after sexing. Any combination of incubation steps can be used which will dictate which structures will be used on the transport incubator (e.g., rack structures needed for rotation during a particular period of the incubation cycle, pallet structures for fixedly holding the eggs but allowing for airflow therethrough during a period of the incubation cycle, hatching structures such as hatching baskets for allowing the eggs to hatch during transport, etc.).

Further, in one or more embodiments, one will recognize that at the delivery of the eggs after incubation in the transport incubator, as described herein, one or more various process flows may occur. However, the present invention is not limited to the illustrative example process flows occurring upon delivery as described herein. For example, hatch baskets may be used for delivery of eggs with hatch occurring in the transport incubator, or egg holding structures (e.g., pallet structures or rack structures) may be delivered for hatching at a finishing facility. Further, for example, if egg holding structures are delivered to a finishing facility, then either racked eggs or palletized eggs are transferred to hatch structures for hatching and/or delivery.

Figure 10:
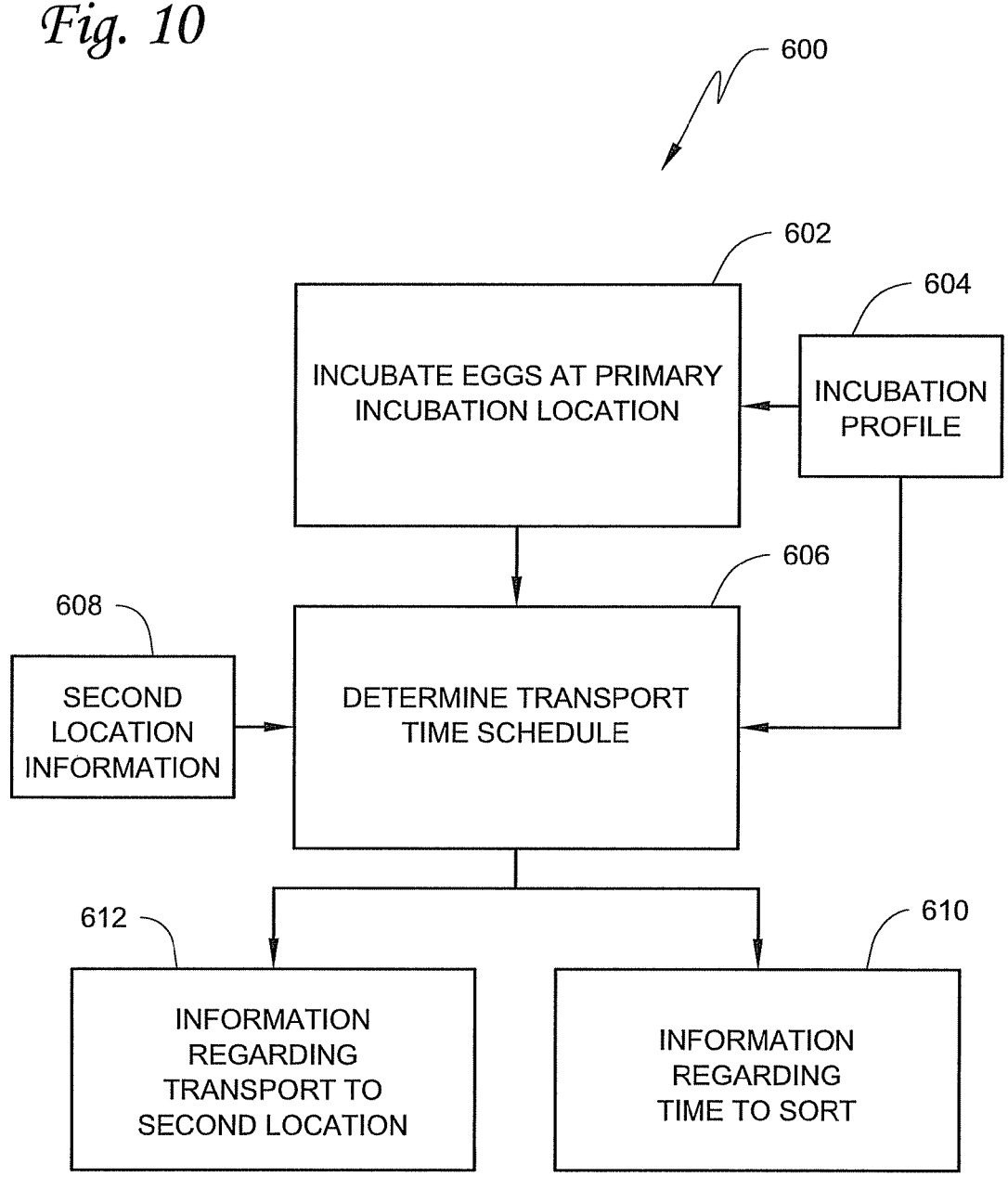
FIG. 10 is a flow diagram of yet another embodiment of an incubation method according to the present invention including the determination of a transport time schedule.

FIG. 10 provides another incubation method 600 according to the present invention. As described herein, eggs are incubated at a primary incubation location (block 602). Such incubation is carried out in an environment controlled by the primary incubation location according to an incubation profile for the eggs (block 604). Also as described herein, during some period of the incubation process, the eggs, or at least a portion of the eggs (e.g., single sex eggs), are provided for transport to a second location.

At least in one embodiment of the present invention, information with regard to the second location (block 608) (e.g., distance from primary incubation facility, secondary facility description including whether incubators or other equipment is available at the facility, etc.) is provided along with the incubation profile (block 604) for use in determining a transport time schedule (block 606). For example, the transport time schedule may provide a schedule for use in transferring at least a portion of the plurality of eggs to a transport incubator based on at least the incubation profile and the information associated with the secondary location. For example, depending upon the delivery time for transporting the eggs (e.g., 14 to 24 hours) and/or the incubation profile, a particular transport time may be selected (block 612). Further, for example, the time schedule may provide for a scheduled time for sorting the plurality of eggs according to sex resulting in at least a plurality of single sex eggs (block 610). One will recognize that other scheduled events may also be dependent upon second location information (block 608) and/or the incubation profile for the eggs (block 604) and may be determined according to the present invention.

For example, a processing apparatus (e.g., a personal computer) may include an application program for determining such a transport time schedule with the application program having access to one or more various types of information (e.g., user input information, second location information, or other types of information stored in memory). Further, for example, such a transport time schedule may be implemented using one or more various spreadsheets.

According to one embodiment of the present invention, the time schedule determines the time at which the plurality of the eggs are transferred to a transport incubator for transport during a portion of the last 10 days of the incubation cycle for the plurality of eggs, during a portion of the last 8 days of the incubation cycle for the plurality of eggs, or during the last 5 days of the incubation cycle. As such, the eggs are transported using pallet structures as the portion of the incubation cycle using racking structures is generally completed.

Yet further, the time scheduling may be optimized so the time schedule provides a time at which the plurality of the eggs are transferred to the portable transport incubator such that the plurality of the eggs arrive at the second location during the last three days of an incubation cycle for the plurality of the eggs, or even within the last day of the cycle. As such, hatching structures may be used for transporting the eggs in the transport incubator. Further, for example, such hatching may occur on the transport incubator and the poults hatching therefrom provided to the finishing facility in the hatch baskets.

All patents and references cited herein are incorporated in their entirety as if each were incorporated separately. This invention has been described with reference to illustrative embodiments and is not meant to be construed in a limiting sense. As described previously, one skilled in the art will recognize that various modifications of the illustrative embodiments, as well as additional embodiments to the invention and combinations of various elements and/or steps, will be apparent to persons skilled in the art upon reference to this description. It is therefore contemplated that the patent and claims will cover any such modifications or embodiments that may fall within the scope of the present invention, as defined by the accompanying claims.

What is claimed is:

1. A method of incubation comprising:
providing an incubator that is movable from a primary incubation location to a secondary location, wherein the incubator is controlled according to an incubation profile including one or more set points for at least one condition of the incubator to be controlled, wherein the at least one condition comprises at least one of humidity, carbon dioxide levels, and temperature in the incubator; and
controlling incubation of a plurality of single sex eggs in the incubator during at least a portion of an incubation process as the incubator is moved between the primary incubation location to the secondary location.

2. The method of claim 1, wherein the incubator is a portable incubator transportable by a vehicle, wherein the vehicle comprises at least one of an aircraft, a rail based vehicle, a water based vessel, a vehicle that transports cargo, and a wheeled vehicle.

3. The method of claim 1, wherein the incubator is a self-contained incubator comprising a power source and controller configured to carry out such incubation.

4. The method of claim 1, wherein controlling incubation of the plurality of single sex eggs comprises maintaining a controlled environment in the interior of the incubator based on an incubation profile used to control partial incubation at the primary incubation location.

5. The method of claim 1, wherein the method further comprises sorting a plurality of eggs being incubated at the primary incubation location resulting in the plurality of single sex eggs to be transported to the secondary location.

6. A system for use in incubating a plurality of eggs, the system comprising:
- a transportable incubation container configured to be moved from a first location to a second location, wherein the transportable incubation container comprises a plurality of spaced apart heat exchange elements defining a plurality of regions within an interior of the transportable incubation container for receiving a plurality of eggs;
- one or more egg holding structures configured to be positioned between at least two adjacent heat exchange elements for holding a plurality of eggs; and
- a controller configured for use in controlling at least one condition within the interior of the transportable incubation container according to an incubation profile for incubation of the plurality of eggs.

7. The system of claim 6, wherein the system further comprises:
- a primary incubator to incubate at least partially a plurality of eggs according to an incubation profile, wherein the incubation profile is associated with a schedule for adjustment of incubation conditions; and
- a sexing apparatus operable to determine the sex of the plurality of eggs after the plurality of eggs are at least partially incubated for use in sorting the plurality of eggs resulting in a plurality of single sex eggs to be provided in the one or more egg holding structures.

8. The system of claim 6, wherein the system further comprises:
- one or more sensors to sense the at least one condition within the interior of the transportable incubation container and provide a sense signal representative of at least one condition to the controller; and
- one or more conditioning components configured to be controlled by the controller based on the incubation profile and the sense signal representative of the at least one condition.

9. The system of claim 8, wherein the one or more sensors comprise at least one of humidity or moisture sensor, a carbon dioxide sensor, and a temperature sensor.

10. The system of claim 8, wherein the one or more conditioning components comprise at least one of air flow components to move air to one or more portions of the interior of the transportable incubation container, heat exchange components to adjust temperature in the interior of the transportable incubation container, and one or more humidity control components for adjusting the humidity within the interior of the transportable incubation container, and one or more components configured to control carbon dioxide within the interior of the transportable incubation container.

11. The system of claim 8, wherein the one or more conditioning components comprise one or more redundant conditioning components, wherein the one or more redundant components comprise at least one of one or more redundant air flow components to move air to one or more portions of the interior of the transportable incubation container, one or more redundant heat exchange components to adjust temperature in the interior of the transportable incubation container, one or more redundant humidity control components for adjusting the humidity within the interior of the transportable incubation container, and one or more redundant components configured to control carbon dioxide within the interior of the transportable incubation container.

12. The system of claim 6, wherein the controller is configured to receive an incubation profile based at least in part on an incubation profile used to control incubation of the plurality of eggs at a primary incubation location.

13. The system of claim 12, wherein the system comprises means for transferring the incubation profile used to control incubation at the primary incubation location to the controller operable to control the at least one condition in the interior of the transportable incubation container.

14. The system of claim 6, wherein the portable incubation container is a container configured to be transported by a wheeled vehicle.

15. The system of claim 6, wherein the incubation profile is based at least on one of genetics of the plurality of eggs, hold time of the plurality of eggs prior to transfer to an incubator, statistical performance of previous incubation processes, and one or more characteristics of an incubator used to perform the incubation of the plurality of eggs.

16. The system of claim 6, wherein the transportable incubation container is part of a self-contained incubator comprising a power source and the controller configured to control the at least one condition in the interior of the transportable incubation container.

17. The system of claim 6, wherein the one or more egg holding structures comprise one or more pallet structures for holding a plurality of eggs in a fixed position as the transportable incubation container is moved from one location to another location.

18. The system of claim 6, wherein the one or more egg holding structures comprise one or more rack structures for use in rotating the plurality of eggs as the transportable incubation container is moved from one location to another location.

19. The system of claim 6, wherein the transportable incubation container comprises at least one valve controlled air intake and at least one valve controlled exhaust outlet coupled to the controller for control thereof.

20. The system of claim 6, wherein the transportable incubation container is constructed of mating parts that are sealant coated prior to assembly.

21. The system of claim 6, wherein the transportable incubation container is transported by a vehicle, wherein the vehicle comprises an additional means for controlling the at least one condition within the interior of the transportable incubation container from within the vehicle.

* * * * *